United States Patent [19]

Hwang

[11] Patent Number: 4,792,160
[45] Date of Patent: Dec. 20, 1988

[54] STRUCTURE FOR PIPE FITTINGS

[76] Inventor: Biing-Yih Hwang, No. 89, Lin Yen South Road, Lin Yen Shian, Kaohsiung Hsien, Taiwan

[21] Appl. No.: 129,288

[22] Filed: Dec. 7, 1987

[51] Int. Cl.$^4$ ............................................. F16L 35/00
[52] U.S. Cl. ..................................... 285/39; 285/150; 285/348; 285/351; 285/356
[58] Field of Search ................ 285/348, 356, 351, 39, 285/150

[56] References Cited

U.S. PATENT DOCUMENTS

| | | | |
|---|---|---|---|
| 302,343 | 7/1884 | Kitton | 285/356 |
| 1,202,196 | 10/1916 | Lewis | 285/356 X |
| 2,190,419 | 2/1940 | Evarts | 285/351 X |
| 4,183,560 | 1/1980 | Wyss | 285/348 X |

Primary Examiner—Dave W. Arola
Attorney, Agent, or Firm—Larson and Taylor

[57] ABSTRACT

An improved structure for a metal pipe fittings. Each passage hole of the body of a pipe fitting, such as an elbow, a tee, a cross etc., is provided with a female thread which a male-threaded ring screws in with tightly to press a metal ring and several gaskets abutting against one another around a pipe to be united. The tight screwing of said male-threaded ring in the female thread forces the gaskets to expand between the pipe and the body of the fitting keeping the pipe and the fitting tightly united.

1 Claim, 4 Drawing Sheets

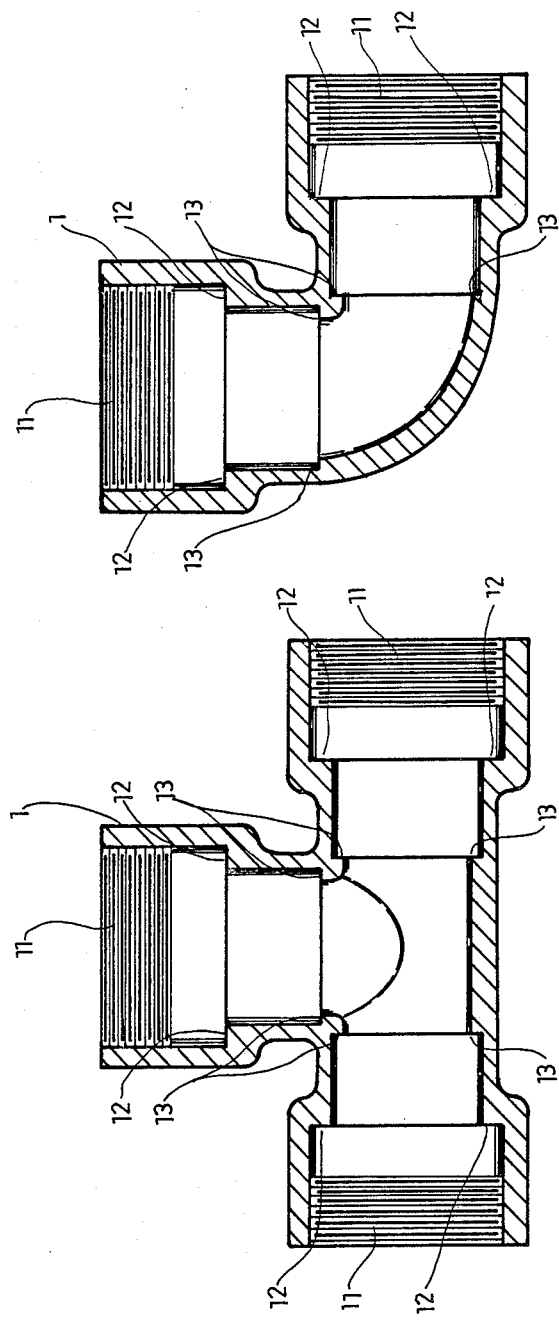

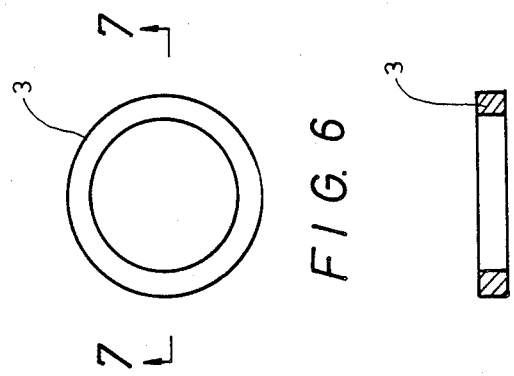
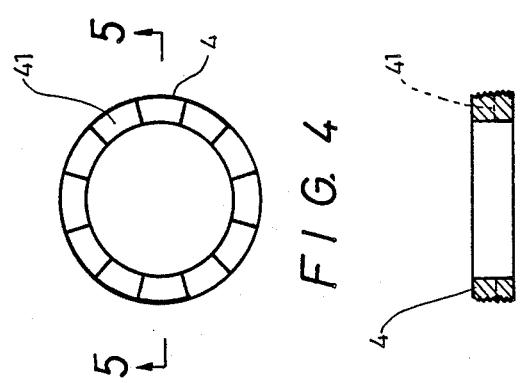

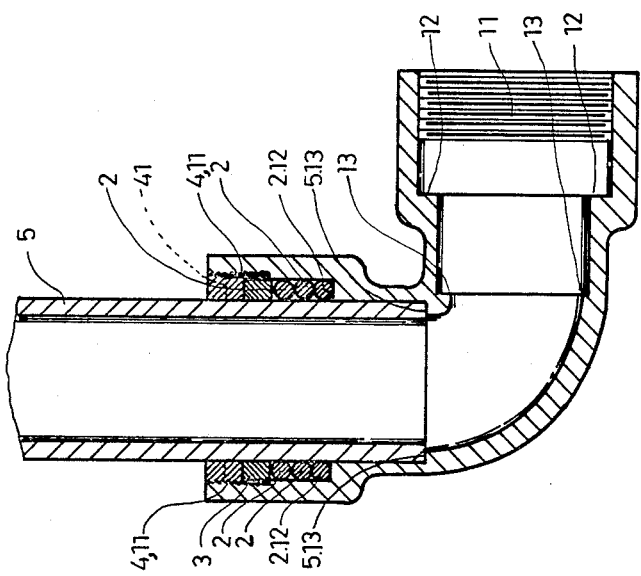
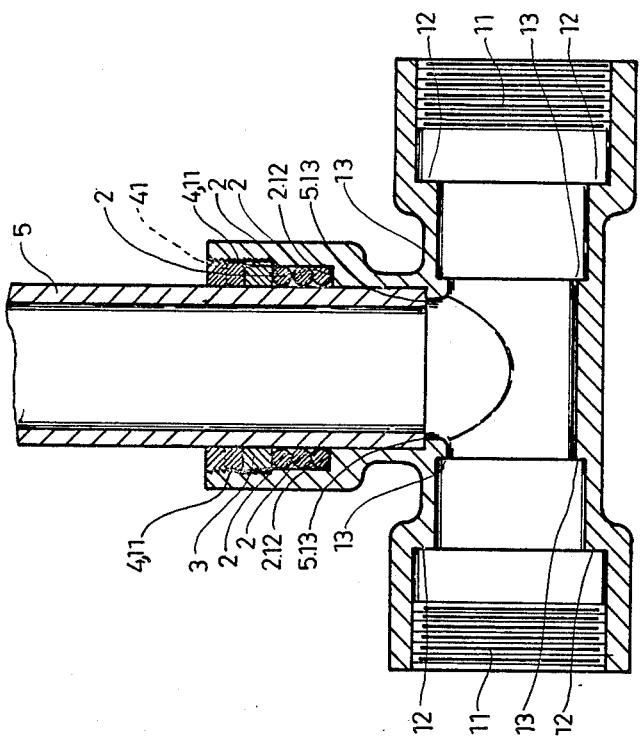

4,792,160

STRUCTURE FOR PIPE FITTINGS

BACKGROUND OF THE INVENTION

Commonmetal pipe fittings such as an elbow, a tee, a cross, etc., are generally provided with female threads for screwing with male threads at the ends of metal pipes. This kind of structure for uniting metal pipes is quite inconvenient as pipes often have to be cut to a proper length and male threads have to be newly made. This takes time and work, especially if the pipes should be brought back to a work place from the site for thread cutting. Besides, the thickness of the pipe should become thinner and the surface may be broken after the male thread is cut on the pipe, so the threaded part may easily be corroded and brlken after a period of use. In addition, a metal pipe used for high heated liquid can expand, so an aperture can be formed at a pipe fitting letting the liquid in the pipe leak out. Above all, a stainless steel pipe is widely used for transporting hot water, but is has a rather large rate of expansion, so its fittings are liable to break and cause leakage after a long period of use.

SUMMARY OF THE INVENTION

This invention has been made to improve the structure of pipe fittings for quickly uniting metal pipes without the necessity of cutting male threads on them with said improved pipe fittings.

Any pipe fitting with this improved structure is provided with passage holes cut with a female thread, the first blocking and the second blocking edge abutting against one another. Said female thread is for a male-threaded ring to screw in with, the first blocking edge for several anti-leak gaskets to stay at and the second blocking edge with the smallest diameter to block the end of a pipe to be united when said pipe is inserted in the passage hole. Besides, there is a metal ring placed between said male-threaded ring and said gaskets for pressing said gaskets to expand between the pipe and the fitting body keeping both of them tightly united when said male-threaded ring is tightly screwded in said female thread.

BRIEF DESCRIPTION OF THE DRAWINGS

FIG. 2 is a cross-sectional view of the first example witht his improved structure for pipe fittings int his invention.

FIG. 3 is a cross-sectional view of the second example with this improved structure for pipe fittings inthis invention.

FIG. 4 is an top view of the male-threaded ring in this invention.

FIG. 5 is a cross-sectional view of 5—5 line on FIG. 4.

FIG. 6 is an to view of the metal ring in this invention.

FIG. 7 is a cross-sectional view of 7—7 line on FIG. 6.

FIG. 8 is a cross-sectional view of the first example united with a pipe.

FIG. 9 is a cross-sectional view of the second example united with a pipe.

DETAILED DESCRIPTION OF THE INVENTION

Figure 1:
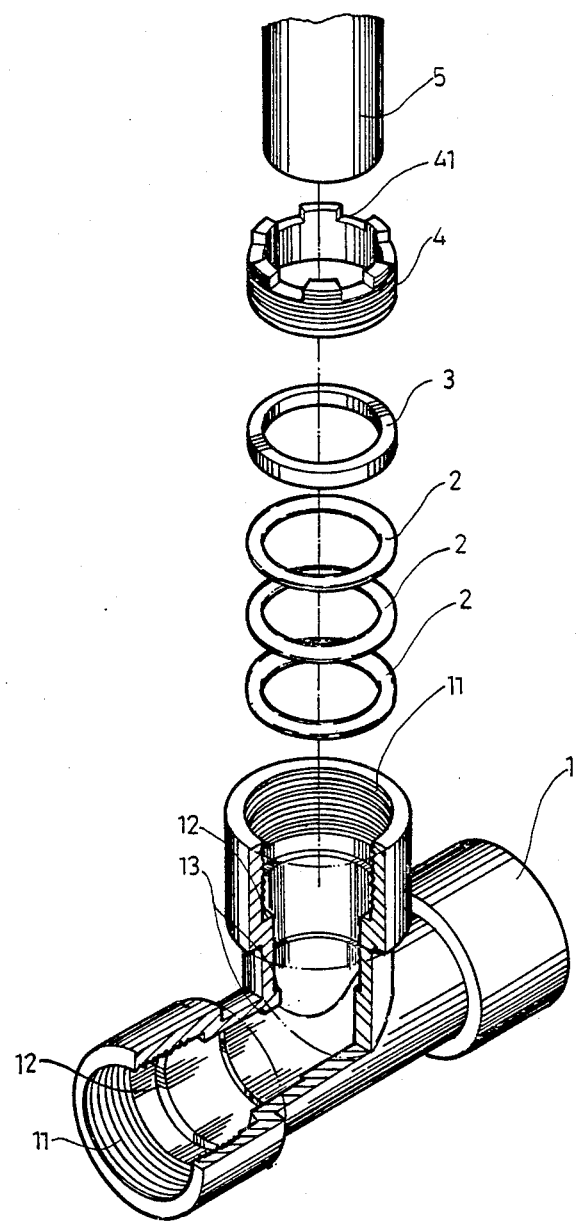
FIG. 1 is an exploded perspective view of the first example with the improved structure for pipe fittings in this invention.

First, a pipe fitting having this improved structure shown in FIGS. 1, 2 and 3 is the first example in this invention, a tee fitting. Its body 1 has three passage holes for liquid which are provided separately with female thread 11, first blocking edge 12 and second blocking edge 13 abutting against one another; female thread 11 is located at the most outer part with a larger diameter than the two blocking edges 12 and 13 and the diameter of second blocking edge 13 is shorter than that of first blocking edge 12.

Next, anti-leak gaskets 2 shown in FIG. 1 are made of elastic rubber, and their inner diameter can just insert around the outer diameter of a pipe 5. Metal ring 3, as shown in FIGS. 6 and 7, is to be put before several anti-leak gaskets 2, and its flat surface can pushevenly anti-leak gaskets 2.

Male-threaded ring 4 shown in FIGS. 4 and 5 is provided with a male thread for uniting with any passage hole 11 of body 1, and with notches 41 on the flat curcumferential surface for a turning tool to insert in so as to turn the ring 4.

As FIGS. 8 and 9 show, when a metal pipe 5 is to be united with body 1, anti-leak gaskets 2, metal ring 3 and male-threaded ring are orderly inserted around the outer surface of the pipe; the metal pipe should be inserted in the passage hole with its end touching and blocked by second blocking edge 13; several anti-leak gaskets 2 should be placed at the unthreaded part of the hole ith themost inner flat surface touching and blocked by first blocking edge 12; then screwing tightly male-threaded ring 4 in female thread 11 of body 1 can press metal ring 3, which in order presses anti-leak gaskets 2 to expand toward the inner and the outer diameter so that there cam be no aperture for leaking between the pipe and the pipe fitting.

After a pipe fitting has been united with a metal pipe and buried in a building, the necessity for dismantling them hardly occurs, so anti-leak gaskets 2 never wears out nor let the liquid running in the pipe leak out because said gaskets never have to turn around. Besides, male-threaded ring 4 never has in turning any contact or frictionwith anti-leak gaskets owing to their location at the unthreaded part of the passage hole, which can never cause any leakage.

What is claimed is:

1. A system for connecting pipes together comprising:
    a pipe fitting having at least two passage components, each said passage component being provided with a passage hole therethrough and including (a) a distal female-threaded, cylindrical portion, (b) an intermediate cylindrical portion ending in a first blocking edge and (c) a proximal cylindrical portion ending in a second blocking edge, said first blocking edge having a smaller diameter than said female-threaded portion and said second blocking edge having a smaller diameter than said first blocking edge and the pipe such that the pipe is inserted past said first blocking edge and abuts said second blocking edge;
    a plurality of anti-leak gaskets which are sized to fit around the pipe and inside of said intermediate portion, an innermost one of said gaskets abutting said first blocking edge;

a metal ring which is sized to fit around the pipe and inside of said intermediate portion and which abuts an outermost one of said gaskets; and a male-threaded ring sized to be threadably received completely within said distal female-threaded portion and around the pipe, said male-threaded ring including a distal circumferential end surface in which notches are provided for the reception of a turning tool whereby said male-threaded ring is threadably advanced completely into said female-threaded portion to press against said metal ring which in turn presses against said gaskets to expand said gaskets between the pipe and said intermediate portion to unite and seal the pipe to said pipe fitting.

* * * * *